United States Patent
Park et al.

(10) Patent No.: US 9,768,650 B2
(45) Date of Patent: Sep. 19, 2017

(54) STATOR AND MOTOR COMPRISING SAME

(75) Inventors: Kyungsang Park, Seoul (KR); Gyusun Park, Seoul (KR); Musung Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 198 days.

(21) Appl. No.: 13/384,313

(22) PCT Filed: Jul. 14, 2010

(86) PCT No.: PCT/KR2010/004564
§ 371 (c)(1),
(2), (4) Date: Jan. 16, 2012

(87) PCT Pub. No.: WO2011/008016
PCT Pub. Date: Jan. 20, 2011

(65) Prior Publication Data
US 2012/0112599 A1    May 10, 2012

(30) Foreign Application Priority Data

Jul. 14, 2009  (KR) .................. 10-2009-0064069

(51) Int. Cl.
| H02K 1/16 | (2006.01) |
| H02K 1/14 | (2006.01) |
| H02K 15/095 | (2006.01) |

(52) U.S. Cl.
CPC ............ *H02K 1/148* (2013.01); *H02K 1/146* (2013.01); *H02K 15/095* (2013.01)

(58) Field of Classification Search
CPC ....... H02K 1/146; H02K 15/095; H02K 1/148
(Continued)

(56) References Cited

U.S. PATENT DOCUMENTS

| 2,012,368 A | * | 8/1935 | Zetsche ...................... 310/265 |
| 2,607,816 A | | 8/1952 | Ryder et al. |

(Continued)

FOREIGN PATENT DOCUMENTS

| JP | 05-091683 A | 4/1993 |
| JP | 2004-064924 A | 2/2004 |

(Continued)

OTHER PUBLICATIONS

Office Action dated Dec. 9, 2010 in Korean Application No. 10-2009-0064069, filed Jul. 14, 2009.

(Continued)

*Primary Examiner* — Alex W Mok
(74) *Attorney, Agent, or Firm* — Saliwanchik, Lloyd & Eisenschenk

(57) ABSTRACT

The present invention relates to a stator and a motor equipped with the stator, the stator including an inner core including an inner core body and a plurality of teeth radially formed at a periphery of the inner core body; a coil wound on each tooth; an outer core multiply divided to be coupled between the plurality of teeth; and a press-fitting unit formed at the inner core and the outer core to allow the outer core to be press-fitted between the teeth, whereby it is easy to assemble the stator and to wind the coil, thereby reducing a manufacturing cost and enhancing concentricity level between an external diameter and an inner diameter of a stator core.

8 Claims, 4 Drawing Sheets

(58) Field of Classification Search
USPC .................................. 310/216.009, 216.008
See application file for complete search history.

(56) References Cited

U.S. PATENT DOCUMENTS

| | | | | |
|---|---|---|---|---|
| 5,722,152 | A * | 3/1998 | Sumi et al. ..................... | 29/596 |
| 6,166,474 | A * | 12/2000 | Kohara et al. ......... | 310/216.093 |
| 6,781,278 | B2 * | 8/2004 | Liao ........................... | 310/254.1 |
| 6,822,364 | B2 | 11/2004 | Suzuki et al. | |
| 6,879,079 | B2 * | 4/2005 | Vollmer ..................... | 310/254.1 |
| 7,215,052 | B2 * | 5/2007 | Blase et al. ..................... | 310/87 |
| 7,466,054 | B2 * | 12/2008 | Watson et al. ........... | 310/156.08 |
| 7,608,969 | B2 * | 10/2009 | Suzuki et al. ......... | 310/216.009 |
| 2002/0125782 | A1 | 9/2002 | Peachee et al. | |
| 2002/0175587 | A1 * | 11/2002 | Vollmer ........................ | 310/179 |
| 2003/0066183 | A1 | 4/2003 | Nouzumi | |
| 2003/0127933 | A1 * | 7/2003 | Enomoto et al. ............. | 310/194 |
| 2004/0124734 | A1 * | 7/2004 | Liao .............................. | 310/218 |
| 2006/0061229 | A1 * | 3/2006 | Suzuki et al. ................ | 310/217 |
| 2008/0134491 | A1 | 6/2008 | Nishimura | |
| 2009/0108699 | A1 * | 4/2009 | Li et al. ........................ | 310/254 |
| 2009/0189477 | A1 * | 7/2009 | Yamamoto ............. | 310/216.058 |

FOREIGN PATENT DOCUMENTS

| | | |
|---|---|---|
| JP | 2006-254617 A | 9/2006 |
| JP | 2007-195281 A | 8/2007 |
| WO | WO-2009013043 A2 | 1/2009 |

OTHER PUBLICATIONS

International Search Report in International Application No. PCT/KR2010/004564, filed Jul. 14, 2010.
Office Action dated Mar. 31, 2017 in European Application No. 10800027.4.

* cited by examiner

【Figure 1】
【Prior Art】
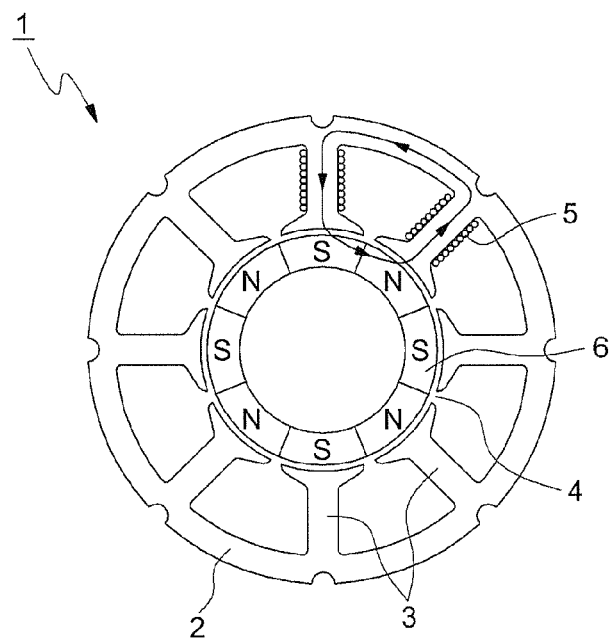
【Figure 2】
【Prior Art】
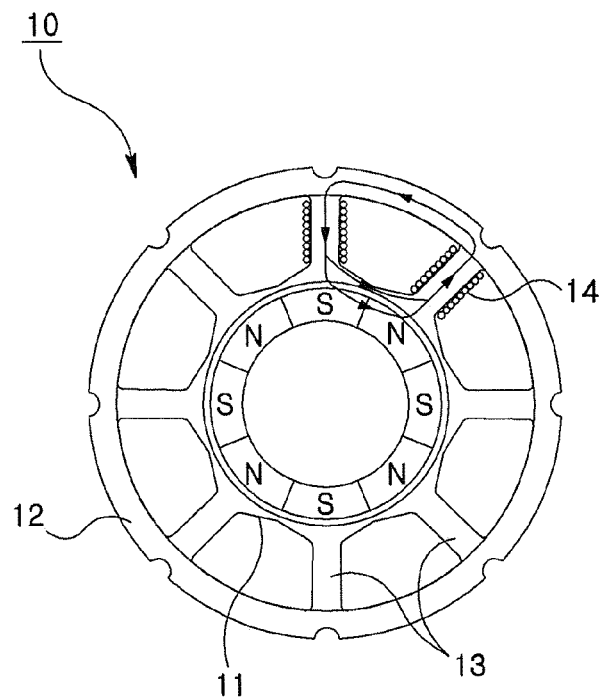

[Figure 3]
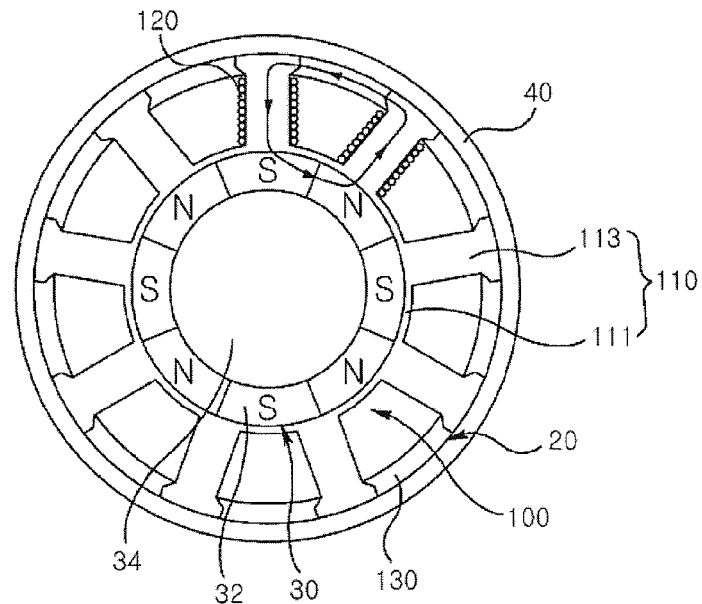
[Figure 4]
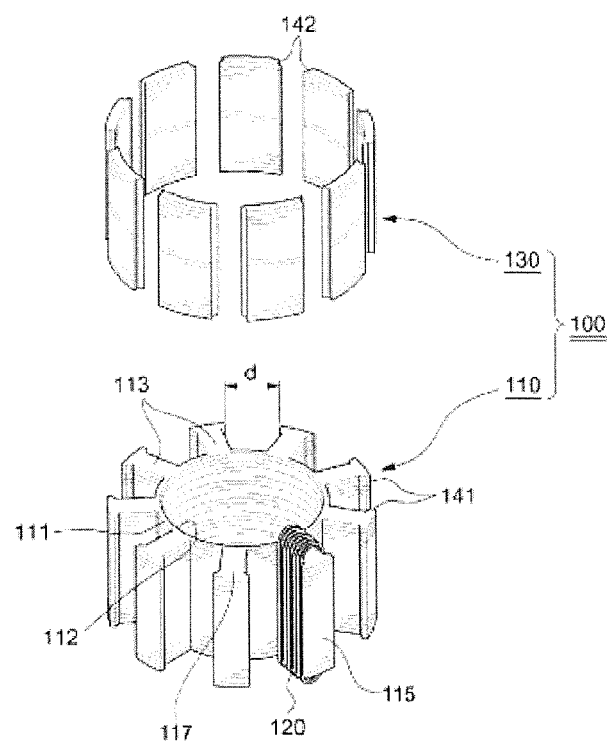

【Figure 5】
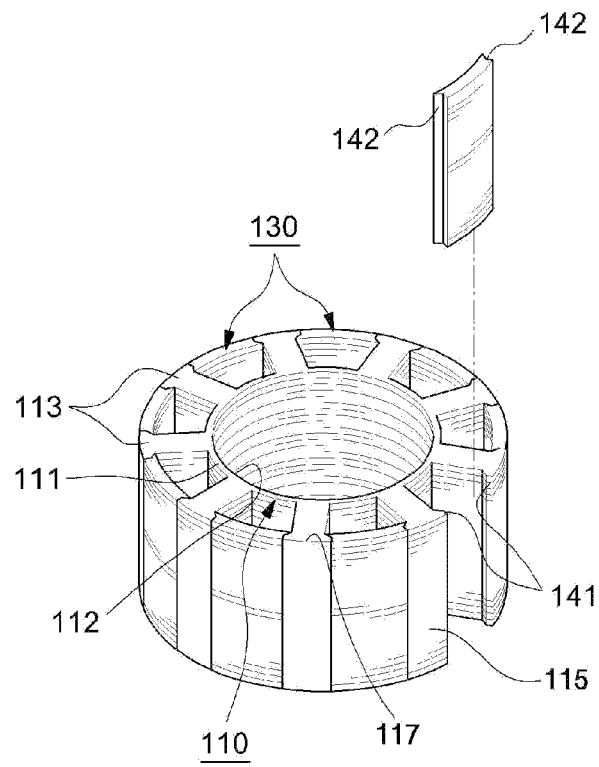
【Figure 6】
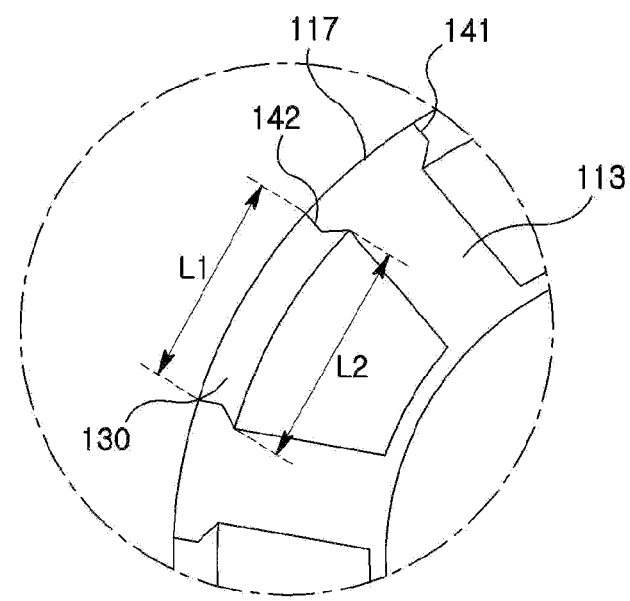

[Figure 7]
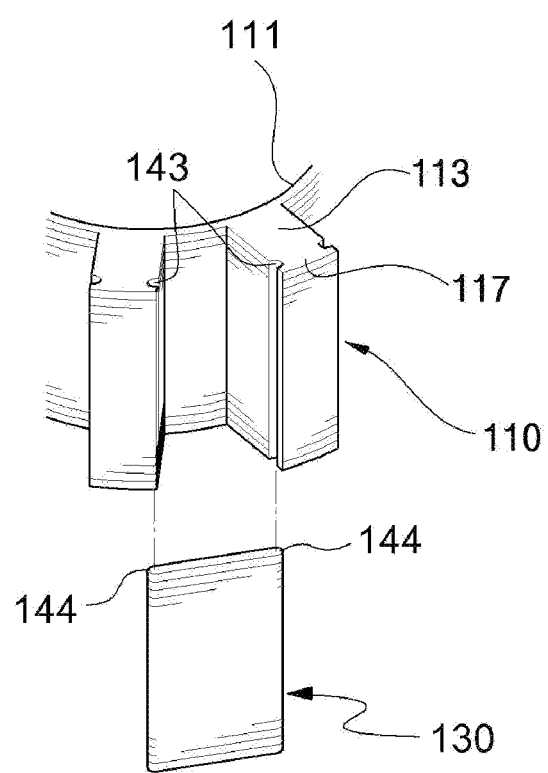

STATOR AND MOTOR COMPRISING SAME

CROSS-REFERENCE TO RELATED APPLICATION

This application is the U.S. national stage application of International Patent Application No. PCT/KR2010/004564, filed Jul. 14, 2010, which claims priority to Korean Application No. 10-2009-0064069, filed Jul. 14, 2009, the disclosures of each of which are incorporated herein by reference in their entirety.

TECHNICAL FIELD

The teachings in accordance with the exemplary embodiments of this invention relate generally to a stator and a motor equipped with the stator.

BACKGROUND ART

Generally, a motor includes a stator applied with a power, and a rotor rotating in interaction with the stator. The stator in turn includes a stator core and a stator coil wound on the stator core. The rotor includes a plurality of magnets arranged inside the stator and a rotation shaft to which the magnets are fixed.

FIG. 1 is a schematic views of a stator core according to prior art.

The stator core (1) according to the prior art includes a plurality of teeth (3) radially arranged and wound by a coil (5) and a ring-shaped core wheel (2) integrally connected to a periphery of the teeth (3), where the core wheel (2) is integrally formed with the periphery of the teeth (3) and magnets (6) are integrally arranged at an inner circumference of the teeth. At this time, a jig is inserted to a gap between the teeth (3) to wind the coil (5) on each tooth (3).

However, it is problematic to wind the coil (5) on each tooth (3) through a narrow gap, which takes a lot of time for winding and needs an expensive coil winding machine. In order to solve the problems, a stator core (10) is proposed in which an inner core (11) having a plurality of radially connected teeth (13), and an outer core (12) secured to an external end of the teeth (13) is separated, as shown in FIG. 2.

The stator core (10) is configured in such a manner that a coil (14) is wound on each tooth (13), and a distal end of each tooth (13) is fixed with the outer core (12). However, the stator core (10) is also problematic in that an expensive mold has to be employed to ensure a dimensional accuracy at an area where the inner core (11) and the outer core (12) are mutually coupled, a separate exclusive jig must be used to couple the inner core to the outer core, and assembly work becomes complicated because the inner core must be coupled to the outer core that is thermally expanded, when the inner core and the outer core are coupled.

DISCLOSURE

Technical Problem

The present invention is directed to solve the aforementioned problems, disadvantages or shortcomings, and is to provide a stator having a structure assembled by press-fitting between an outer core and an inner core to make it easy to couple the inner core to the outer core, to shorten a work time and to reduce a manufacturing cost, and a motor equipped with the stator.

Technical problems to be solved by the present invention are not restricted to the above-mentioned, and any other technical problems not mentioned so far will be clearly appreciated from the following description by skilled in the art.

Technical Solution

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a stator, the stator comprising: an inner core including an inner core body and a plurality of teeth radially formed at a periphery of the inner core body; a coil wound on each tooth; an outer core multiply divided to be coupled between the plurality of teeth; and a press-fitting unit formed at the inner core and the outer core to allow the outer cores to be press-fitted between the teeth.

Preferably, the inner core and the outer core are formed by stacking thin metal plates.

Preferably, the outer core is formed by press-fitting one sheet of thin metal plates between the two teeth, or by stacking each one sheet of thin metal plates at a predetermined height and press-fitting the each sheet between two teeth.

Preferably, a periphery of a distal end of each tooth takes the shape of a curvature.

Preferably, the outer core takes the shape of a curvature to form a circle if press-fitted between two teeth.

Preferably, the press-fitting unit includes press-fitting lugs formed at lateral surfaces of a distal end unit of the teeth, and press-fitting grooves formed at both lateral surfaces of the outer core and press-fitted over the press-fitting lugs.

Preferably, the outer core is such that a width (L1) at an external surface is narrower than a width (L2) at an inner surface.

Preferably, the press-fitting unit includes press-fitting grooves formed at lateral surfaces of a distal end unit of the teeth, and press-fitting lugs formed at both lateral surfaces of the outer core and press-fitted into the press-fitting grooves.

In another general aspect of the present invention, there is provided a motor equipped with a stator, the rotor comprising: a stator secured to an inner surface of a housing to apply a power, and a rotor arranged at an inner surface of the stator to perform a rotating movement, wherein the stator includes an inner core including an inner core body and a plurality of teeth radially formed at a periphery of the inner core body; a coil wound on each tooth; an outer core multiply divided to be coupled between the plurality of teeth; and a press-fitting unit formed at the inner core and the outer core to allow the outer cores to be press-fitted between the teeth.

Advantageous Effects

The stator thus configured according to the present invention has advantageous effects in that the stator includes an inner core wound by a coil and a multiply-divided outer core to be press-fitted into the inner core, whereby it is easy to assemble the stator and to wind the coil, thereby reducing a manufacturing cost and enhancing concentricity level between an external circumference and an inner circumference of a stator core.

DESCRIPTION OF DRAWINGS

The teachings of the present invention can be readily understood by considering the following detailed description in conjunction with the accompanying drawings, in which:

FIG. 1 is a plan view of a stator according to prior art;

FIG. 2 is a plan view of a stator in another exemplary embodiment according to the prior art;

FIG. 3 is a cross-sectional view of a motor according to an exemplary embodiment of the present invention;

FIG. 4 is an exploded perspective view of a stator core according to an exemplary embodiment of the present invention;

FIG. 5 is a coupled perspective view of a stator core according to an exemplary embodiment of the present invention;

FIG. 6 is a partially enlarged view of a stator core according to an exemplary embodiment of the present invention; and FIG. 7 is a partially enlarged view of a press-fitting unit according to another exemplary embodiment of the present invention.

BEST MODE

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present invention with unnecessary detail. Thus, the present invention is not limited to the exemplary embodiments which will be described below, but may be implemented in other forms. In the drawings, the width, length, thickness, etc. of components may be exaggerated or reduced for the sake of convenience.

Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. The terms "a" and "an" herein do not denote a limitation of quantity, but rather denote the presence of at least one of the referenced item.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera.

Now, exemplary embodiment of the present invention will be described in detail with reference to the accompanying drawings.

FIG. 3 is a cross-sectional view of a motor according to an exemplary embodiment of the present invention.

The motor according to the exemplary embodiment of the present invention includes a housing (40), a stator (20) arranged inside an inner surface of the housing and applied with a power, and a rotor (30) arranged at an inner circumferential surface of the stator (20) to rotate by interacting with the stator (20).

The stator (20) includes a stator core (100) radially arranged with a plurality of teeth (113) and a stator coil (120) wound on the teeth (113) and applied with the power. Furthermore, the rotor (30) includes a plurality of magnets (32) circumferentially arranged at an inner circumferential surface of the stator (20), each at a predetermined gap, and a rotation shaft (34) secured with the magnets (32) to perform the rotating movement.

FIG. 4 is an exploded perspective view of a stator core according to an exemplary embodiment of the present invention, and FIG. 5 is a coupled perspective view of a stator core according to an exemplary embodiment of the present invention.

A stator core (100) according to an exemplary embodiment of the present invention includes an inner core (110) radially arranged with a plurality of teeth (113) on which a coil (120) is wound, and an outer core (130) press-fitted into the inner core (110). The inner core (110) further includes a ring-shaped inner core body (111) to allow magnets (32) radially arranged on an inner circumferential surface (112) each at a predetermined gap and a plurality of teeth (113) radially formed at a periphery of the inner core body (111) each at a predetermined gap.

The inner core (110) is formed by stacking a plurality of thin silicon plates, where the inner core body (111) and the teeth (113) are integrally formed. A predetermined gap (d) is formed between the teeth (113) to allow obtaining a space for an easy winding of coil on the teeth.

The outer core (130) is press-fitted between the teeth (113), and as a result, an outer wheel and an inner wheel of the stator core (100) can form a concentrical circle to allow an external surface (115) of an end unit at the teeth (113) to take the shape of a curvature.

The outer core (130) is formed by stacking a plurality of thin metal plates, and is divided into a plurality of sections to allow the inner core (110) to be coupled between the teeth (113).

In a case the outer core (130) is coupled to between the teeth (113), the outer core takes the shape of a curvature to allow an external surface of the stator core (130) to form a circular shape. That is, in a case the outer core (130) is coupled to between the teeth (113), the external surface of the stator core (100) takes the shape of a circle, whereby an external circumference and an inner circumference of the stator core (100) form a concentrical circle.

Between the inner core (110) and the outer core (130), there are formed press-fitting units (141, 142) to allow the plurality of outer cores (130) to be press-fitted. The press-fitting units (141, 142) includes press-fitting lugs (141) formed at both lateral surfaces of a distal end unit (117) of the inner core (110), and press-fitting grooves (142) formed at both lateral surfaces of the outer core (130) to be press-fitted over the press-fitting lugs.

Each of the press-fitting lugs (141) is such that both lateral surfaces of a distal end unit (117) of the inner core (110) are protrusively formed to a lateral direction, and each of the press-fitting grooves is formed in a concave shape to allow the press-fitting lugs (141) to be press-fitted over the press-fitting grooves (142).

Referring to FIG. 6, the outer core is such that a width (L1) at an external surface is narrower than a width (L2) at an inner surface to prevent the outer core (130) from being disengaged from the inner core (110). Therefore, in a case the press-fitting lugs (141) are press-fitted over the press-fitting grooves (142), both lateral surfaces of the outer core (130) are hitched on the both lateral surfaces of the distal end unit (117) of the inner core (110) to prevent the outer core (130) from being disengaged from the inner core (110).

MODE FOR INVENTION

FIG. 7 is a partially enlarged view of a press-fitting unit according to another exemplary embodiment of the present invention.

Press-fitting units (143, 144) according to another exemplary embodiment of the present invention are such that press-fitting grooves (143) are formed on both lateral surfaces of the distal end unit (117) of the inner core (110), and press-fitting lugs (144) that are press-fitted over the press-fitting grooves (143) are formed at both lateral surfaces of the outer core (130).

As noted from the foregoing, the stator core according to the present invention is advantageous in that an assembly can be easily realized by press-fitting the outer core (130) over the inner core (110) to enable an easy assemblage, and to enhance a concentrical level between an inner circumference and an outer circumference of the stator core.

In case of assembly, each tooth (113) of the inner core (110) is wound with a coil (120). At this time, there is formed a gap between the teeth (113) spacious enough to allow an easy winding of the coil on the teeth. Once the coil winding work is completed, the distal end unit (117) of the inner core (110) is press-fitted with each outer core (130), where the press-fitting method is such that each outer core (130) is positioned at an upper side or a lower side of the inner core (110), and the press-fitting lugs (141) are slidingly press-fitted into the press-fitting grooves.

The press-fitting method is such that several outer cores (130) are grasped by a separate jig (not shown), and each outer core (130) is inserted between two teeth (113), or several outer cores (130) are inserted at one time among the teeth. Either of two ways may be employed.

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

INDUSTRIAL APPLICABILITY

The present invention has an industrial applicability in that the stator includes an inner core wound by a coil and a multiply-divided outer core to be press-fitted into the inner core, whereby it is easy to assemble the stator and to wind the coil, thereby reducing a manufacturing cost and enhancing concentricity level between an external circumference and an inner circumference of a stator core.

The invention claimed is:

1. A motor having an easy assembly structure, the motor comprising:
   a housing;
   a stator arranged in the housing, the stator including a stator core formed by stacking thin metal plates and a coil wound on the stator core; and
   a rotor rotatably installed in the stator, the rotor including a rotation shaft and a plurality of magnets;
   wherein the stator core comprises an inner core having an opening to install the rotor, a plurality of outer cores discretely formed with the inner core, and a plurality of press-fitting units to detachably couple each outer core with the inner core;
   wherein the inner core includes a ring-shaped boss integrally formed in a single piece having an inner circumference and an outer circumference to form a shape of a concentric circle with respect to the rotation shaft, and a plurality of teeth radially and integrally formed at the outer circumference of the boss, wherein each of the plurality of teeth has a same shape and interval spaced from each other,
   wherein each of the plurality of outer cores is separate from each other, each outer core having an inner surface and an outer surface, the entire inner surface of each outer core being a continuous curvature that is concentric with the inner and outer circumferences of the boss, the outer surface of each outer core also being concentric with the inner and outer circumferences of the boss, and a distal outer end of the tooth has a curvature corresponding to that of the outer surface of the outer core;
   wherein each of the plurality of press-fitting units comprises a groove and a lug formed in a shape complementary to the groove, such that the lug is press-fitted in the groove and configured to inhibit the outer core from being disengaged from the inner core;
   wherein the lug is formed with an upper lateral surface vertical with respect to a radial length and a lower surface inclined with respect to the radial length,
   wherein a distance between the vertical upper lateral surfaces of the neighboring lugs is smaller than a distance between the inclined lower surfaces of the neighboring lugs,
   wherein an outer surface of each tooth has a curvature same as that of the outer surface of each outer core, such that an imaginary circumference formed by connecting neighboring outer surfaces of the teeth and outer surfaces of the outer cores is concentric with the inner circumference of the boss, and
   wherein when the plurality of outer cores stacked with each other is press-fittingly coupled with the inner core through the press-fitting units, an outer wheel and an inner wheel of the stator core are configured to form concentric circles to enhance concentricity level of the stator core.

2. The motor according to claim 1, wherein each lug is formed at an opposite outer distal end of each tooth of the inner core and each groove is formed at an opposite lateral surface of each outer core.

3. The motor according to claim 1, wherein each lug is formed at an opposite lateral surface of each outer core and each groove is formed at an opposite outer distal end of each tooth of the inner core.

4. The motor according to claim 1, wherein the inner distal ends of the teeth form the ring-shaped boss without any gap, the boss having a uniform thickness in a radial direction.

5. The motor according to claim 1, wherein a set of stacked outer cores as a whole is inserted between outer distal ends of the neighboring teeth of the inner core coupled by the plurality of press-fitting units, respectively.

6. The motor according to claim 1, neighboring teeth of the plurality of teeth are spaced apart to form an opening to allow the coil to be wound on the stator core.

7. The motor according to claim 6, wherein the outer surface of each of the plurality of teeth takes a shape with a same curvature.

8. The motor according to claim 7, wherein when the motor is assembled, an outer periphery of the stator core forms a circular shape concentric with the inner circumference of the boss.

* * * * *